United States Patent [19]

Miyashita

[11] Patent Number: 5,790,960
[45] Date of Patent: Aug. 4, 1998

[54] BATTERY PACK FOR USE WITH ONE OF PLURAL RADIO SYSTEMS

[75] Inventor: Toshikazu Miyashita, Tokyo, Japan

[73] Assignee: NEC Corporation, Tokyo, Japan

[21] Appl. No.: 562,216

[22] Filed: Nov. 28, 1995

[30] Foreign Application Priority Data

Nov. 29, 1994 [JP] Japan ................................ 6-294357

[51] Int. Cl.⁶ .......................................... H04Q 7/32
[52] U.S. Cl. .................... 455/572; 455/348; 455/575
[58] Field of Search ................................ 455/89, 90, 93,
455/88, 142, 351, 349, 550, 572, 573, 575,
344, 347, 348, 557, 558; 320/2; 379/357,
441, 446; 361/679, 683, 686

[56] References Cited

U.S. PATENT DOCUMENTS

| | | | |
|---|---|---|---|
| 3,855,534 | 12/1974 | Holcomb et al. | 455/349 |
| 4,887,311 | 12/1989 | Garner et al. | 455/349 |
| 5,136,229 | 8/1992 | Galvin | 455/573 |
| 5,349,698 | 9/1994 | Maru | 455/89 |
| 5,423,078 | 6/1995 | Epperson et al. | 455/572 |
| 5,448,765 | 9/1995 | Kovanen et al. | 455/89 |
| 5,487,099 | 1/1996 | Maekawa | 455/558 |
| 5,533,177 | 7/1996 | Braitberg et al. | 455/557 |

FOREIGN PATENT DOCUMENTS

| | | |
|---|---|---|
| 0 445 808 | 9/1991 | European Pat. Off. . |
| 0 521 609 | 1/1993 | European Pat. Off. . |
| 0 622 935 | 11/1994 | European Pat. Off. . |
| 4-286444 | 10/1992 | Japan . |
| 5-292165 | 11/1993 | Japan . |
| 6-046001 | 2/1994 | Japan . |

*Primary Examiner*—Nguyen Vo
*Assistant Examiner*—Lester G. Kincaid
*Attorney, Agent, or Firm*—Young & Thompson

[57] ABSTRACT

A battery pack device (32) is for use in combination with a portable radio communication device (31) for carrying out a radio communication in accordance with a specific one of a plurality of radio systems. The battery pack device comprises battery section (41) for supplying the portable radio communication device to an electric power when the battery pack section is coupled to the portable radio communication device. A selecting circuit (42e) selects the specific radio system from the radio systems to produce a specific select signal. A control section (42a to 42d) controls man-machine interface section (36 to 40) in response to specific select signal.

16 Claims, 3 Drawing Sheets

BATTERY PACK FOR USE WITH ONE OF PLURAL RADIO SYSTEMS

BACKGROUND OF THE INVENTION

1. Field of the Invention

This invention relates to a battery pack device and, more particularly, to a battery pack device coupled to a portable radio communication device for supplying electric power to the portable radio communication device.

2. Description of the Related Art

In general, a portable radio communication apparatus is known which comprises a portable radio communication device and a battery pack device. The battery pack device is coupled to the portable radio communication device in order to supply electric power to the portable radio communication device. Supplied with the electric power from the battery pack device, the portable radio communication device is put into operation so that the portable radio communication device is able to carry out radio communication.

A conventional portable radio communication apparatus is disclosed in Japanese Unexamined Patent Publication Tokkai Hei 5-292165 (292165/1993). In the conventional portable radio communication apparatus, the portable radio communication device comprises a radio communication circuit and a control circuit. The radio communication circuit carries out the radio communication under the control of the control circuit. The control circuit controls the radio communication circuit in accordance with a specific one of a plurality of radio systems that is preassigned to the control circuit. More particularly, the control circuit has a basic function concerned to the specific radio system.

The battery pack device comprises a battery section and an optional circuit. The optional circuit has an optional function concerned to the specific radio system. When the battery pack device is coupled to the portable radio communication device, the battery section supplies electric power to the radio communication device and the optional circuit. Furthermore, the optional circuit is connected to the control circuit. As a result, the portable radio communication device has the basic function and the optional function.

However, it is impossible to use the battery pack device in another radio communication device which carries out radio communication in accordance with another radio system different from the specific radio system inasmuch as the battery pack device comprises the optional circuit having the optional function concerned with the specific radio system. Namely, the battery pack device is only used in the radio communication device which carries out the radio communication in accordance with the specific radio system. Therefore, the battery pack device has no flexibility in the conventional portable radio communication apparatus.

SUMMARY OF THE INVENTION

It is therefore an object of this invention to provide a battery pack device having flexibility for a plurality of radio systems.

Other objects of this invention will become clear as the description proceeds.

On describing the gist of this invention, it is possible to understand that a battery pack device is for use in combination with a portable radio communication device for carrying out a radio communication in accordance with a specific one of a plurality of radio systems. The battery pack device is coupled to the portable radio communication device to supply the portable radio communication device with electric power. The portable radio communication device comprises radio communication means for carrying out the radio communication, individual control means for controlling the radio communication means on the basis of the specific radio system, and man-machine interface means for connecting the individual control means to a user.

According to this invention, the battery pack device comprises battery means for supplying the portable radio communication device with the electric power when the battery pack device is coupled to the portable radio communication device, selecting means for selecting the specific radio system from the radio systems to produce a specific select signal, and common control means supplied with the electric power from the battery means for controlling the man-machine interface means in response to the specific select signal. The battery pack device may comprise the man-machine interface means.

DESCRIPTION OF THE PREFERRED EMBODIMENT

Figure 1:
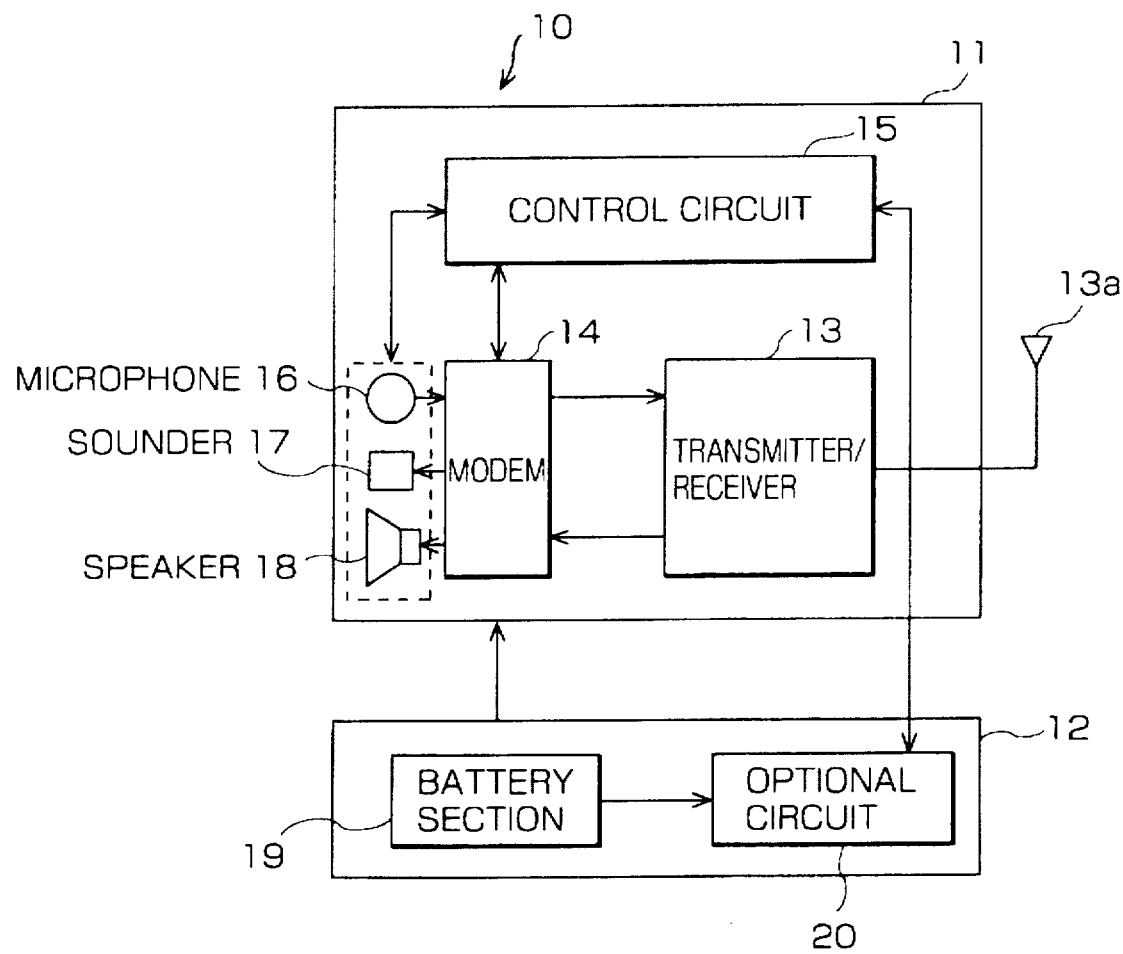
FIG. 1 is a block diagram of a conventional prior art radio communication device.

Referring to FIG. 1, description will first be made as regards a conventional portable radio communication apparatus for a better understanding of this invention. The illustrated portable radio communication apparatus 10 is for carrying out radio communication in accordance with a specific one of a plurality of radio systems. The specific radio system may be, for example, either one of π/4 quadrature phase. shift keying (π/4 QPSK) and Gaussian minimum shift keying (GMSK).

The portable radio communication apparatus 10 comprises a portable radio communication device 11 and a battery pack device 12 coupled to the portable radio communication device 11. The battery pack device 12 is connected to the portable radio communication device 11 through a connector section (not shown).

The portable radio communication device 11 comprises a transmitter/receiver 13, a modulator and demodulator (MODEM) 14, a control circuit 15, a microphone 16, a sounder 17, and a speaker 18. The transmitter/receiver 13 is connected to an antenna 13a.

The battery pack device 12 comprises a battery section 19 and an optional circuit 20.

When the battery pack device 12 is connected to the portable radio communication device 11 through the connector section, the battery section 19 is connected to each part of the portable radio communication device 11. Furthermore, the optional circuit 20 is connected to the control circuit 15. On putting a main switch (not shown) into an on-state in the portable radio communication device 11, electric power is supplied from the battery section 19 to each part of the portable radio communication device 11 and the optional circuit 20. As a result, the portable radio communication device 11 is put into operation. Namely, the portable radio communication device 11 is able to carry out the radio communication in accordance with the specific radio system.

The transmitter/receiver 13, the MODEM 14, the microphone 16, the sounder 17, and the speaker 18 may be collectively operable as a radio communication circuit. The radio communication circuit carries out the radio communication under control of the control circuit 15. Namely, the control circuit 15 controls the radio communication circuit in accordance with the specific radio system which is preassigned to the control circuit 15. The control circuit 15 has a basic function concerned to the specific radio system.

A transmitted signal based on the specific radio system is received at the transmitter/receiver 13 as a received signal through the antenna 13a. The received signal is demodulated by the MODEM 14. The demodulated signal may be, for example, a sound signal, a speech signal, or a message signal.

When a demodulated signal is the sound signal, the sound signal is supplied from the MODEM 14 to the sounder 17 under the control of the control circuit 15. Similarly, the speech signal is supplied from the MODEM 14 to the speaker 18 under the control of the control circuit 15.

When the demodulated signal is the message signal, the control circuit 15 supplies the message signal to the optional circuit 20. The optional circuit 20 is keyed to particular characteristics of a specific radio system. The optional circuit 20 may have a display unit and a keyboard unit (not shown). Supplied with the message signal, the optional circuit 20 controls the display unit in accordance with the optional function to display the message signal as a message on the display unit.

When a speech signal is passed from the microphone 16 to the MODEM 14, the MODEM 14 modulates the speech signal into a modulated signal under the control of the control circuit 15. Supplied with the modulated signal, the transmitter/receiver 13 transmits the modulated signal as a transmission signal through the antenna 13a.

When a message is supplied from the keyboard unit to the optional circuit 20, the optional circuit 20 produces a message signal from the message in accordance with the optional function of that specific radio system. The message signal is supplied from the optional circuit 20 to the control circuit 15. The control circuit 15 controls the MODEM 14 so that the MODEM 14 modulates the message signal into the modulated signal.

Inasmuch as the optional circuit 20 has the optional function characteristic of a specific radio system as described above, it is impossible to use the battery pack device 12 in another radio communication device which carries out radio communication in accordance with another radio system different from the specific radio system.

Figure 2:
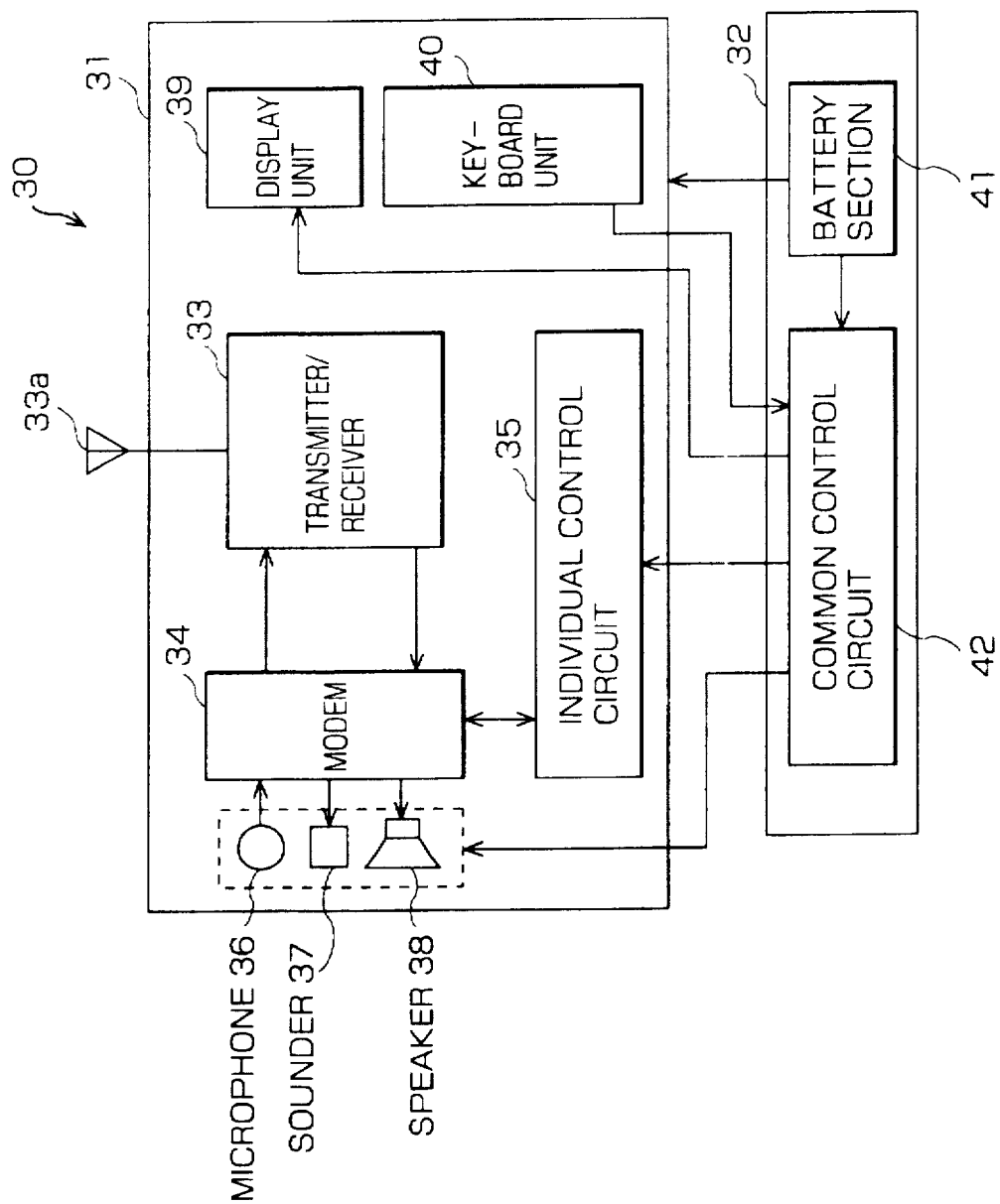
FIG. 2 is a block diagram of a radio communication device according to a preferred embodiment of this invention.

Referring to FIG. 2, description will proceed to a portable radio communication apparatus comprising a battery pack device according to a preferred embodiment of this invention. The illustrated portable radio communication apparatus is different in structure from the portable radio communication apparatus 10 illustrated in FIG. 1 and is therefore designated by a reference numeral 30. The portable radio communication apparatus 30 comprises a portable radio communication device 31 and a battery pack device 32 which are different in structure from the portable radio communication device 11 and the battery pack device 12 described with reference to FIG. 1.

The portable radio communication device 31 comprises a transmitter/receiver 33, a modulator and demodulator (MODEM) 34, an individual control circuit 35, a microphone 36, a sounder 37, a speaker 38, a display unit 39, and a keyboard unit 40. The transmitter/receiver 33 is connected to an antenna 33a.

The battery pack device 32 comprises a battery section 41 and a common control circuit 42.

When the battery pack device 32 is connected to the portable radio communication device 31 through a connector section (not shown), the battery section 41 is connected to each part of the portable radio communication device 31. Furthermore, the common control circuit 42 is connected to the individual control circuit 35, the microphone 36, the sounder 37, the speaker 38, the display unit 39, and the keyboard unit 40. On putting a main switch (not shown) into an on-state in the portable radio communication device 31, electric power is supplied from the battery section 41 to each part of the portable radio communication device 31 and the common control circuit 42. As a result, the portable radio communication device 31 is put into operation.

It will be assumed that the portable radio communication device 31 carries out radio communication in accordance with the specific radio system. In the example being illustrated, the transmitter/receiver 33 and the MODEM 34 may be collectively operable as a radio communication circuit. The individual control circuit 35 controls the radio communication circuit in accordance with the specific radio system which is preassigned to the individual control circuit 35. More particularly, the individual control circuit 35 carries out timing control of transmit/receive, an error correcting operation, an interleave operation, and channel control.

Figure 3:
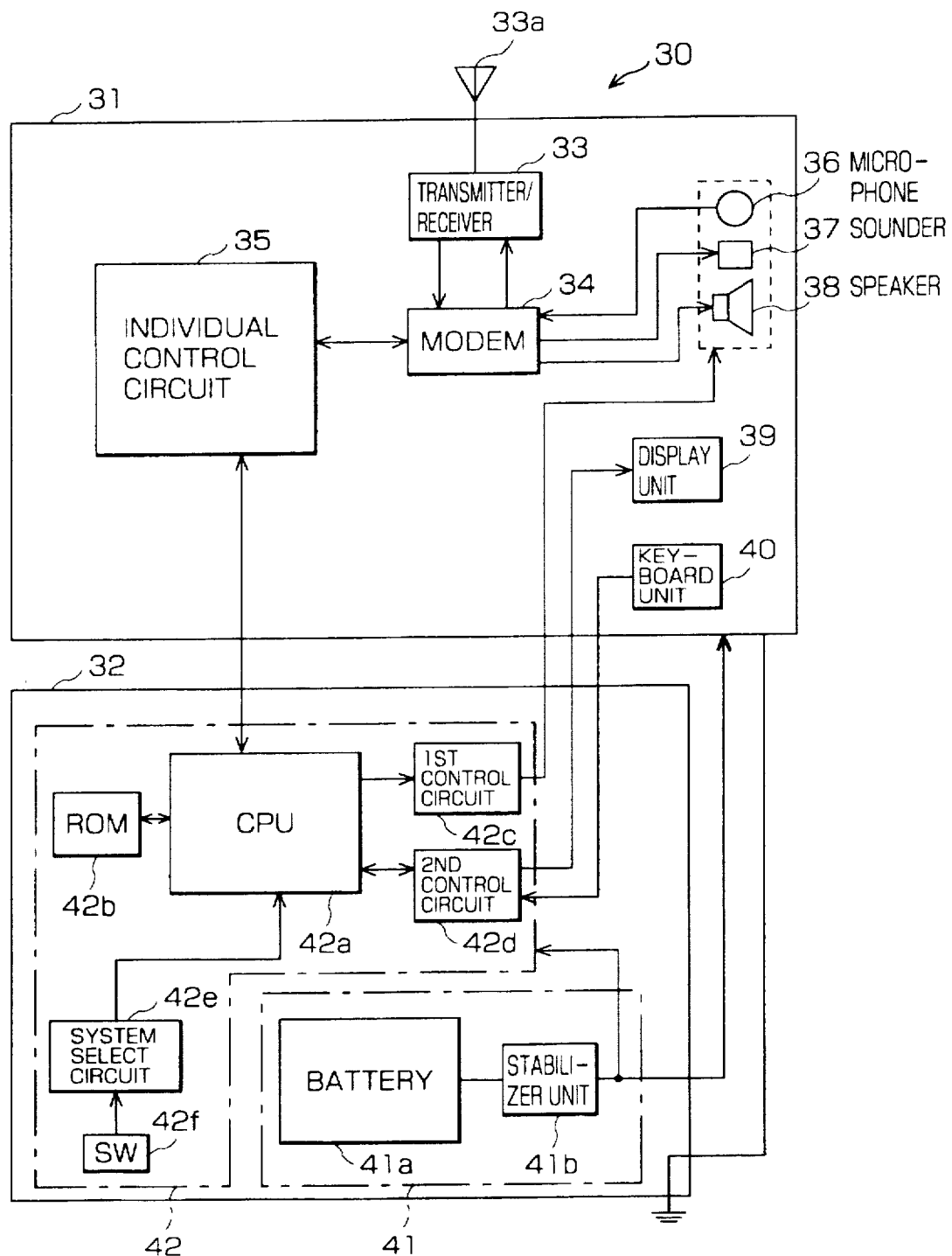
FIG. 3 is a block diagram for illustrating the battery pack device illustrated in FIG. 2.

Referring to FIG. 3, the common control circuit 42 comprises a central processing unit (CPU) 42a, a read-only-memory (ROM) 42b, a first control circuit 42c, a second control circuit 42d, a system select circuit 42e, and a select switch 42f. The battery section 41 comprises a battery 41a and a stabilizer unit 41b. The electric power is supplied from the battery 41a to the common control circuit 42 and the portable radio communication device 31 through the stabilizer unit 41b.

It will be assumed that first through N-th processing programs corresponding to first through N-th radio systems are stored in ROM 42b, where N represents a positive integer which is greater than one. The first through the N-th processing programs are for use in carrying out processing on the basis of the first through the N-th radio systems, respectively. The select switch 42f is for use in selecting one of the radio systems.

It will be assumed that the specific radio system is equal to the first radio system. The portable radio communication device 31 may be called a first portable radio communication device. On connecting the battery pack device 32 to the portable radio communication device 31, the first radio system is selected by the select switch 42f inasmuch as the portable radio communication device 31 carries out radio communication in accordance with the first radio system. When the first radio system is selected by the select switch 42f, the system select circuit 42e supplies the CPU 42a with a first select signal representative of the first radio system.

Responsive to the first select signal, the CPU 42a reads the first processing program out of the ROM 42b. The CPU 42a carries out operation on the basis of the first processing program as will be later described.

A transmitted signal based on the first radio system is received at the transmitter/receiver 33 as a received signal through the antenna 33a. The received signal is demodulated into a demodulated signal by the MODEM 34 under the control of the individual control circuit 35. The demodulated signal may be, for example, a sound signal, a speech signal, or a message signal.

When the demodulated signal is the sound signal, the sound signal is supplied from the MODEM 34 to the sounder 37 under the control of the individual control circuit 35. The sound signal is further supplied to the CPU 42a. The CPU 42a monitors/whether or not the level of the sound signal exists within a predetermined range. When the level of the sound signal does not exist within the predetermined level range, the CPU 42a controls the first control circuit 42c so that the first control circuit 42c adjusts the sound level of the sounder 37.

Similarly, the speech signal is supplied from the MODEM 34 to the speaker 18 under the control of the individual control circuit 35 when the demodulated signal is a speech signal. The speech signal is further supplied to the CPU 42a. The CPU 42a monitors whether or not the level of the speech signal exists within the predetermined level range. When the level of the speech signal does not exist within the predetermined level range, the CPU 42a controls the first control circuit 42c so that the first control circuit 42c adjusts the level of the speaker 38.

When the demodulated signal is the message signal, the individual control circuit 35 supplies the message signal to the CPU 42a. The CPU 42a processes the message signal into a processed signal on the basis of the first processing program. The processed signal is supplied from the CPU 42a to the second control circuit 42d.

Supplied with the message signal, the second control circuit 42d controls the display unit 39 to display the processed signal as a message on the display unit 39.

When a speech signal is passed from the microphone 38 to the MODEM 34, the MODEM 14 modulates the speech signal into a modulated signal under the control of the individual control circuit 35. Supplied with the modulated signal, the transmitter-receiver 33 transmits the modulated signal as a transmission signal through the antenna 33a.

When a message is supplied from the keyboard unit to the second control circuit 42d, the second control circuit 42d delivers the message to the CPU 42a. The CPU 42a processes the message into a message signal on the basis of the first processing program. The message signal is supplied from the CPU 42a to the individual control circuit 35. The individual control circuit 35 controls the MODEM 34 so that the MODEM 34 modulates the message signal into the modulated signal.

The battery pack device 32 may be connected to another portable radio communication device which may be called a second portable radio communication device. The second portable radio communication device is similar in structure to the first portable radio communication device 31. The portable second portable radio communication device carries out radio communication in accordance with the second radio system which may be the specific radio system. When the battery pack device 32 may be connected to the second portable radio communication device, the second radio system is selected by the select switch 42f.

As readily understood from the above description, the system select circuit 42e supplies the CPU 42a with a second select signal representative of the second radio system.

Responsive to the second select signal, the CPU 42a reads the second processing program out of the ROM 42b. The CPU 42a carries out operation on the basis of the second processing program in a manner similar to the manner described in conjunction to FIG. 3.

Although the portable radio communication device 31 comprises the display unit 39 and the keyboard unit 40 in the above-mentioned embodiment, the battery pack device 32 may comprise the display unit 39 and the keyboard unit 40. In such a case the common control circuit 42 is connected to only the individual-control circuit 35 when the battery pack device is coupled to the portable radio communication device. The individual control circuit controls the display unit 39 and the keyboard unit 40 in a manner similar to the manner described in conjunction to FIG. 3.

Furthermore, the battery pack device may comprises the microphone 36, the sounder 37, and the speaker 38 in addition to the display unit 39 and the keyboard unit 40. In this case, MODEM 34 is connected to the microphone 36, the sounder 37, and the speaker 38 when the battery pack device is coupled to the portable radio communication device.

What is claimed is:

1. A removable battery pack device for use in combination with a portable radio communication device for carrying out a radio communication in accordance with a specific one of a plurality of radio systems, said battery pack device being coupled to said portable radio communication device to supply said portable radio communication device with electric power, said portable radio communication device comprising radio communication means for carrying out said radio communication, individual control means for controlling said radio communication on the basis of said specific radio systems, and man-machine interface means for connecting said individual control means to a user, said removable battery pack device comprising:

battery means for supplying said portable radio communication device with said electric power when said battery pack device is coupled to said portable radio communication device;

selecting means for selecting the specific radio system from said radio systems to produce a specific select signal; and common control means supplied with said electric power from said battery means for controlling said man-machine interface means in response to said specific select signal, thereby configuring said battery pack device for use with the particular radio system with which the device is currently coupled.

2. A battery pack devices as claimed in claim 1, wherein said man-machine interface means comprises:

a display unit for displaying a display message; and a keyboard unit for use in inputting a keyboard message.

3. A battery pack device as claimed in claim 2, wherein said selecting means comprises:

a select switch for selecting the specific radio system from said radio systems; and a system select circuit responsive to selection of said select switch for producing said specific select signal.

4. A battery pack device as claimed in claim 3, wherein said common control means comprises:

memory means for memorizing a plurality of processing programs corresponding to said radio systems; and man-machine control means responsive to said specific select signal for executing a specific one of said processing programs to control said display means and said keyboard means on the basis of the specific one of said processing programs.

5. A battery pack device as claimed in claim 4, said man-machine interface means further comprising a microphone, a sounder, and a speaker, wherein:

said man-machine control mean controls said microphone, said sounder, and said speaker in accordance with a predetermined signal level range.

6. A battery pack device as claimed in claim 4, said individual control means supplying said man-machine control means to a message signal based on said radio communication, wherein:

said man-machine control means processes said message signal into a displaying message signal on the basis of said specific processing program to display said displaying message signal as said display message on said display means.

7. A battery pack device as claimed in claim 6, wherein, said man-machine control means comprises:

a central processing unit for processing said message signal into said displaying message signal on the basis of said specific processing program; and display control means responsive to said displaying message signal for controlling said display means to display said displaying message signal as said display message on said display means.

8. A battery pack device as claimed in claim 4, said man-machine control means receiving said keyboard message, wherein:

said man-machine control means processes said keyboard message into a keyboard message signal to supply said keyboard message signal to said individual control means;

the individual control means controlling said radio communication means to transmit said keyboard message signal.

9. A removable battery pack device capable of operating with any of a variety of portable radio communication device types within a predefined set of such device types, the removable battery pack device comprising:

selecting means for determining which of the device types is currently attached to the battery pack device and producing an identification signal identifying such attached type;

common control means for influencing operation of the attached portable radio communication device based on the attached type determined by the selecting means, thereby configuring said battery pack device to operate with the particular radio device type with which the removable battery pack device is currently attached; and battery means for supplying power to the attached portable radio communication device, the common control means, and the selecting means.

10. The battery pack device of claim 9, wherein the attached portable radio communication device comprises input/output devices including at least a display unit capable of displaying incoming messages and a keyboard unit which can be used to create outgoing messages, operation of the input/output devices being influenced by the common control means.

11. The battery pack device of claim 10, wherein the selecting means comprises:

a select switch which determines which of the device types is currently attached; and a system select circuit which responds to the determination of the select switch and produces the identification signal.

12. The battery pack device of claim 11, wherein the common control means comprises:

memory means for storing a plurality of processing programs which correspond to the respective device types within the predefined set; and input/output control means for controlling operation of the input/output devices by executing one of the processing programs as selected based on the identification signal.

13. The battery pack device of claim 12, wherein the input/output devices further comprise a microphone, a sounder, and a speaker; and wherein the input/output control means conditions signals passing to and from the microphone, the sounder, and the speaker to be within predetermined signal level ranges.

14. The battery pack device of claim 13, wherein the portable radio communication device supplies an incoming message signal to the input/output control means, which then converts the incoming message signal into a display message signal by executing the selected processing program.

15. The battery pack device of claim 14, wherein the input/output control means comprises:

a central processing unit which executes the selected processing program to convert the incoming message signal into the display message signal; and display control means for controlling operation of the display so as to display the incoming message.

16. The battery pack device of claim 15, wherein each of the outgoing messages generated through the keyboard is received by the input/output control means which converts the outgoing message into a keyboard message signal, the keyboard message signal being supplied to the portable radio communication device which converts the keyboard message signal into an outgoing transmission.

* * * * *